United States Patent [19]

Chao

[11] Patent Number: 5,583,588
[45] Date of Patent: Dec. 10, 1996

[54] SPECTACLE FRAME HAVING ROTARY MEMBERS

[76] Inventor: David Y. Chao, 1120 Green Acre Rd., Towson, Md. 21204

[21] Appl. No.: 624,096

[22] Filed: Mar. 29, 1996

[51] Int. Cl.$^6$ .............................. G02C 5/22; G02C 5/14
[52] U.S. Cl. .............................. 351/153; 351/121; 16/228
[58] Field of Search .................................. 351/111, 113, 351/114, 119, 121, 153; 16/228

[56] References Cited

U.S. PATENT DOCUMENTS 4,269,488   5/1981   Zancaner .................................. 351/113

Primary Examiner—Huy Mai
Attorney, Agent, or Firm—Charles E. Baxley, Esq.

[57]   ABSTRACT

A spectacle frame includes two extensions extended from the side portions. A pulley and a cam are rotatably supported on each of the extensions. A pair of legs are secured to the cams as to be rotated in concert with the cams. The pulley and the cam each includes a peripheral slot for engaging with a ring which couples the pulley and the cam together. The extensions each includes a stop and a curved slot. The cam includes a rod slidably engaged in the curved slot. The rod may be moved against the ring such that the ring may apply a resilient force against the leg.

7 Claims, 2 Drawing Sheets

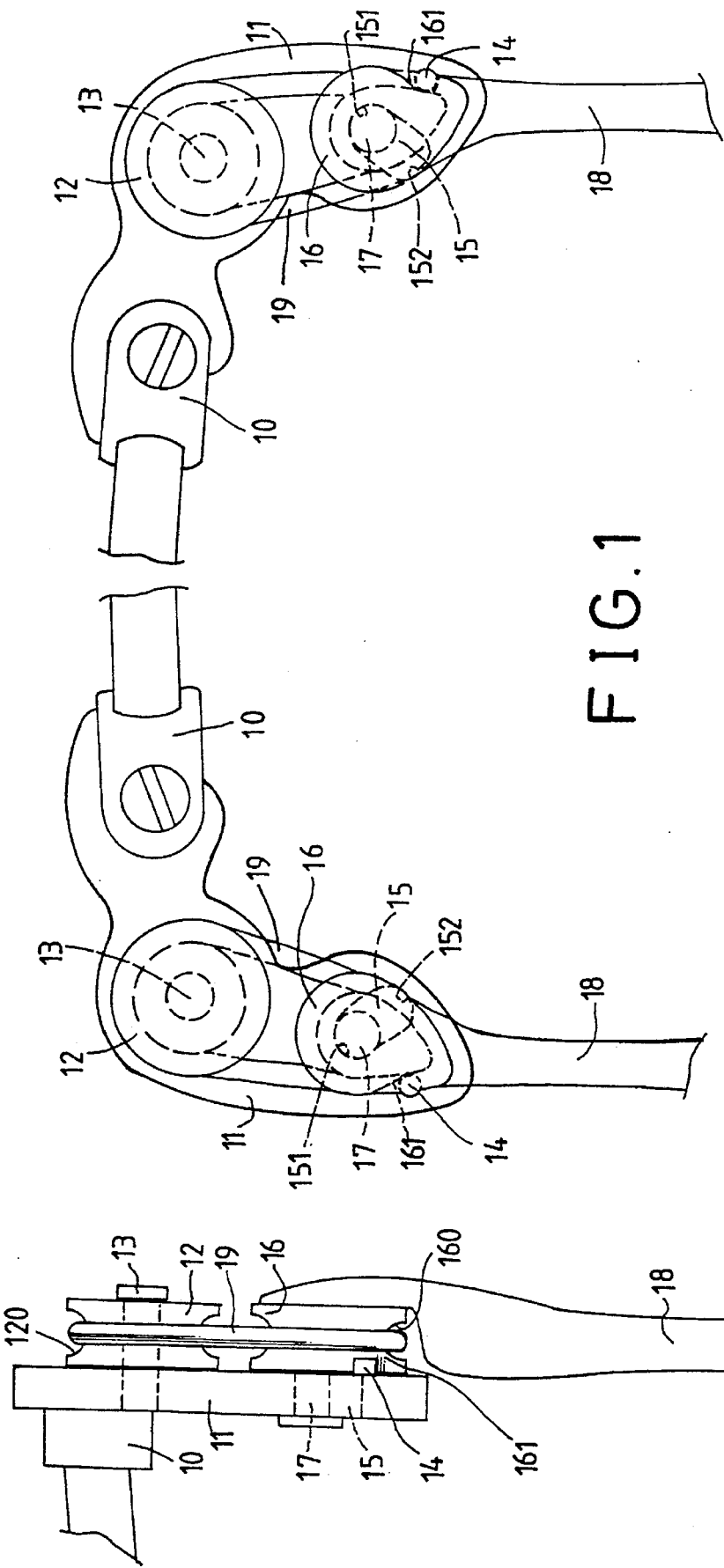

SPECTACLE FRAME HAVING ROTARY MEMBERS

BACKGROUND OF THE INVENTION

1. Field of the Invention

The present invention relates to frame, and more particularly to spectacle frame having two legs coupled to the frame by pulley and ring members.

2. Description of the Prior Art

Typical spectacle frames comprise a pair of legs pivotally coupled to the frame bodies by typical hinges or by spring action hinges for resiliently coupling the legs to the frame bodies.

The present invention has arisen to provide a novel spectacle frame.

SUMMARY OF THE INVENTION

The primary objective of the present invention is to provide a spectacle frame having two legs coupled to the frame by pulley and ring members.

In accordance with one aspect of the invention, there is provided a spectacle frame comprising a frame body including two side portions each having an extension extended therefrom, the extensions each including a first and a second rotary members rotatably secured therein, a pair of legs each including a first end secured to the second rotary members as to allow the legs to be rotated in concert with the second rotary member, and means for coupling the first and the second rotary members together.

The rotary members may be a pulley or a cam. The first and the second rotary members each includes a peripheral slot formed therein, the coupling means includes a ring engaged with the peripheral slots of the first and the second rotary members so as to couple the first and the second rotary members together.

A stop means is provided for limiting a rotational movement of the second rotary member and the leg.

The stop means includes a stop provided on :each of the extensions, and includes a notch formed in the second rotary member for engaging with the stop so as to limit the rotational movement of the second rotary member and the leg.

The extensions each includes a curved slot formed therein and having a center curvature located at the stop and having a first end and a second end, the second rotary member includes a rod slidably engaged in the curved slot, the coupling means includes a ring engaged on the first and the second rotary members for pulling the rod toward the first end of the curved slot and for allowing the rod to be moved toward the second end of the curved slot against the ring when the leg and the second rotary member are rotated about the stop.

Further objectives and advantages of the present invention will become apparent from a careful reading of a detailed description provided hereinbelow, with appropriate reference to accompanying drawings.

BRIEF DESCRIPTION OF THE DRAWINGS

FIG. 1 is a top plane view of a spectacle frame in accordance with the present invention;

FIG. 2 is a side view illustrating the coupling of the legs to the spectacle frame.

DETAILED DESCRIPTION OF THE PREFERRED EMBODIMENT

Figure 3:
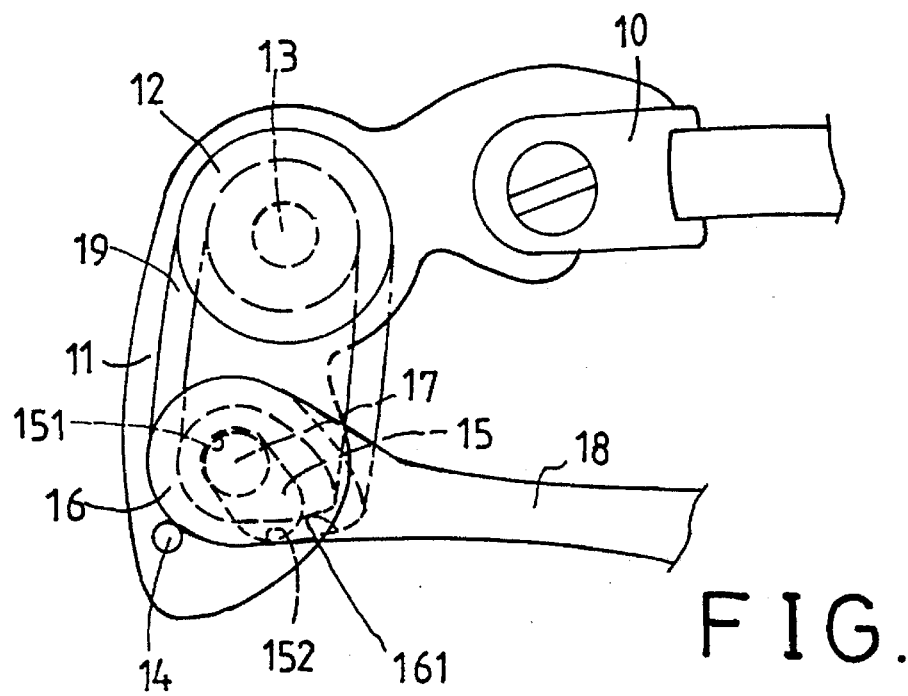
FIGS. 3 and 4 are partial top plane views illustrating the operations of the legs relative to the spectacle frame.

Referring to the drawings, and initially to FIGS. 1 and 2, a spectacle frame in accordance with the present invention comprises a frame body 10 for supporting lenses therein. The frame body 10 includes two side portions each having an extension 11 extended therefrom. The extensions 11 each includes a rotary member, such as a pulley 12 rotatably supported thereon by a shaft 13 and located close to the lenses and each includes a free end portion having a stop 14 provided thereon and having a curved slot 15 formed therein. The center of curvature of the curved slot 15 is preferably located at the stop 14. A rod 17 is slidably engaged in the curved slot 15. Another rotary member, such as a cam 16 is secured to the rod 17 such that the cam 16 is also slidable along the curved slot 15. A pair of legs 18 each includes one end secured to the cam 16 such that the leg 18 rotates in concert with the cam 16. The pulley 12 and the cam 16 each includes a peripheral recess 120, 160 formed therein for engaging with a belt or a ring 19 which couples the pulley 12 and the cam 16 together. The ring 19 is preferably made of rubber material such that the ring 19 includes a resilient characteristic. The cam 16 includes a notch 161 formed therein for engaging with the stop 14 so as to limit the rotational movement of the cam 16. The pulley 12 and the cam 16 and the ring 19 may be easily assembled.

In operation, as shown in FIG. 1, the cam 16 and the ring 19 are arranged such that the ring 19 may apply a force to the cam 16 so as to force the cam 16 to engage with the stop 14 such that the legs 18 may be maintained at the open or working position as shown in FIG. 1. At this moment, the rod 17 is pulled toward one end 151 of the curved slot 15 and closer to the pulley 12 by the ring 19. As shown in FIG. 3, when the leg 18 is rotated toward the lenses or toward a folded position, the ring 19 may apply a force against the cam 16 so as to pull the cam 16 to the folded position as shown in FIG. 3. At this moment, the rod 17 may also be pulled toward one end 151 of the curved slot 15 and closer to the pulley 12 by the ring 19.

Figure 4:
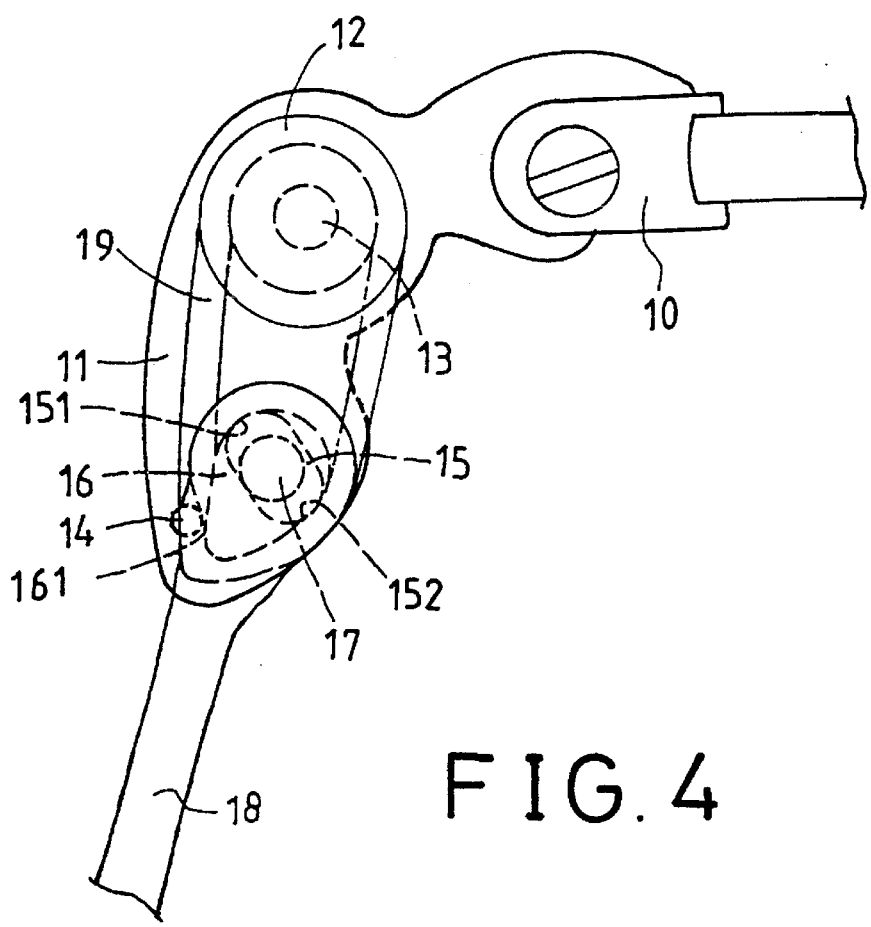

As shown in FIG. 4, when the leg 18 is located at the working position and is moved or rotated outward, both the leg 18 and the cam 16 may be forced to rotate about the stop 14. At this moment, the cam 16 may apply a force against the ring 19 and the rod 17 may be moved toward the other end 152 of the curved slot 15. At this moment, the rod 17 has a tendency to be pulled toward the one end 151 of the curved slot 15 by the resilient ring 19 such that the leg 18 may be biased to engage with the user's head onto which the spectacle frame is engaged.

Alternatively, the position of the pulley and the cam may be changed, or the pulley may be replaced by a cam, and/or the cam may be replaced by a pulley. The only requirement is that a ring is engaged with the two rotary members for coupling the rotary members together.

Accordingly, the spectacle frame in accordance with the present invention includes a novel structure having two rotary members rotatably secured in the side extensions and coupled together by a resilient ring. In addition, a special design allows the legs to be resiliently forced against the user's head.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A spectacle frame comprising:

a frame body including two side portions each having an extension extended therefrom, said extensions each including a first and a second rotary members rotatably secured therein, a pair of legs each including a first end secured to said second rotary members as to allow said legs to be rotated in concert with said second rotary member, and means for coupling said first and said second rotary members together.

2. A spectacle frame according to claim 1, wherein said first rotary member is a pulley.

3. A spectacle frame according to claim 1, wherein said first rotary member is a cam.

4. A spectacle frame according to claim 1, wherein said first and said second rotary members each includes a peripheral slot formed therein, said coupling means includes a ring engaged with said peripheral slots of said first and said second rotary members so as to couple said first and said second rotary members together.

5. A spectacle frame according to claim 1 further comprising a stop means for limiting a rotational movement of said second rotary member and said leg.

6. A spectacle frame according to claim 5, wherein said stop means includes a stop provided on each of said extensions, and includes a notch formed in said second rotary member for engaging with said stop so as to limit the rotational movement of said second rotary member and said leg.

7. A spectacle frame according to claim 6, wherein said extensions each includes a curved slot formed therein and having a center curvature located at said stop and having a first end and a second end, said second rotary member includes a rod slidably engaged in said curved slot, said coupling means includes a ring engaged on said first and said second rotary members for pulling said rod toward said first end of said curved slot and for allowing said rod to be moved toward said second end of said curved slot against said ring when said leg and said second rotary member are rotated about said stop.

* * * * *